(12) United States Patent
Eidenschink et al.

(10) Patent No.: US 8,870,989 B2
(45) Date of Patent: Oct. 28, 2014

(54) AIR TREATMENT DEVICE

(75) Inventors: Rainer Eidenschink, Munich (DE); Stefan Schaebel, Munich (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 13/468,789

(22) Filed: May 10, 2012

(65) Prior Publication Data

US 2012/0304608 A1    Dec. 6, 2012

Related U.S. Application Data

(63) Continuation of application No. PCT/EP2010/067100, filed on Nov. 9, 2010.

(30) Foreign Application Priority Data

Nov. 11, 2009    (DE) .......................... 10 2009 052 787

(51) Int. Cl.
     *B01D 46/00*      (2006.01)
     *F15B 21/04*      (2006.01)
     *B60T 17/00*      (2006.01)

(52) U.S. Cl.
     CPC ......... *F15B 21/048* (2013.01); *B01D 2265/026* (2013.01); *B60T 17/004* (2013.01); *B01D 46/0004* (2013.01); *B01D 2265/022* (2013.01)
     USPC ................ 55/309; 55/385.3; 55/498; 55/491

(58) Field of Classification Search
     None
     See application file for complete search history.

(56) References Cited

U.S. PATENT DOCUMENTS

| | | | |
|---|---|---|---|
| 5,762,671 A | 6/1998 | Farrow et al. | |
| 6,585,792 B2 * | 7/2003 | Schneider et al. | 55/481 |
| 7,946,430 B2 * | 5/2011 | Hawkins et al. | 210/440 |
| 2009/0199523 A1 | 8/2009 | Hilberer | |
| 2011/0315132 A1 * | 12/2011 | Petersen | 123/65 R |

FOREIGN PATENT DOCUMENTS

| | | | |
|---|---|---|---|
| DE | 8228745 | * | 3/1984 |
| DE | 8228745 U1 | * | 3/1984 |
| DE | 35 23 406 A1 | | 1/1987 |
| DE | 10 2006 037 311 A1 | | 2/2008 |
| EP | 0 210 363 A1 | | 2/1987 |
| EP | 2 105 186 A1 | | 9/2009 |

OTHER PUBLICATIONS

Machine translation of DE8228745U1.*
Translation of patent document 8228745.*
Translation of DE8228745U1.*
Copy of p. 8-78 from Perry's Chemical Engineers' Handbook http://ehis.ebscohost.com/ehost/detail?sid=3f5907ca-af62-4063-824d-f8faed5d2d6f@sessionmgr104&vid=1#db=nlebk&AN=219494.*
Translation of DE8228745.*

(Continued)

*Primary Examiner* — Duane Smith
*Assistant Examiner* — Phillip Shao
(74) *Attorney, Agent, or Firm* — Crowell & Moring LLP

(57) ABSTRACT

An air treatment device for a commercial vehicle includes a housing set up for connecting to an air dryer device by way of a bayonet fitting. A retaining device that is or can be mounted on the housing for retaining the bayonet fitting is provided on the housing.

16 Claims, 3 Drawing Sheets

(56) References Cited

OTHER PUBLICATIONS

International Search Report dated Feb. 4, 2011 including English-language translation (Four (4) pages).

German Office Action dated Jun. 29, 2010 including partial English-language translation (Nine (9) pages).

International Preliminary Report on Patentability and Written Opinion of the International Searching Authority including English translation dated May 24, 2012 (fourteen (14) pages).

\* cited by examiner

AIR TREATMENT DEVICE

CROSS-REFERENCE TO RELATED APPLICATIONS

This application is a continuation of PCT International Application No. PCT/EP2010/067100, filed Nov. 9, 2010, which claims priority under 35 U.S.C. §119 from German Patent Application No. DE 10 2009 052 787.7, filed Nov. 11, 2009, the entire disclosures of which are herein expressly incorporated by reference.

This application contains subject matter related to U.S. application Ser. No. 13/468,753, entitled "Drying Agent Cartridge and Air Treatment System With Drying Agent Cartridge," and U.S. application Ser. No. 13/468,773, entitled "Air Treatment System" both being filed on even date herewith.

BACKGROUND AND SUMMARY OF THE INVENTION

The invention relates to an air treatment device for a commercial vehicle, with a housing which is designed for connection to an air dryer device via a quarter turn fastener.

Such air treatment devices of the type in question can be used in commercial vehicles, in particular trucks and tractors. The latter frequently have one or more compressed air consumers which have to be supplied with treated compressed air. Typical compressed air consumers are, for example, a compressed air braking system, a pneumatic spring system, or a parking brake system. A compressed air supply device which in particular has an air treatment system is provided for supplying the commercial vehicle with compressed air. The air treatment system is intended to provide, in particular, dried and purified air. For this purpose, an air treatment device is generally provided with an air dryer device which frequently also has filtering devices for filtering the air. In order to permit easy maintenance or replacement of the filters and, for example, of drying agent, an air dryer cartridge is generally used as the air dryer device which can be connected to the air treatment device or can be inserted into the latter. In order to connect the air dryer device to the air treatment system, a quarter turn connection or a quarter turn fastener can be used in this case. This connects the air dryer device to the air treatment device via a plug-in and turn connection. Examples of quarter turn fasteners for connecting air dryer cartridges to air treatment systems are described in laid open specification DE 10 2006 037 311 A1, to which reference is hereby explicitly made.

However, upon removal or exchanging of an air dryer device or air dryer cartridge, the air treatment device and therefore also the air dryer cartridge may still be pressurized. When a quarter turn fastener is unscrewed, the high pressure in the air treatment device may cause the quarter turn fastener to be released abruptly, thus putting nearby people and, in particular, the person removing the air dryer cartridge at risk. In addition, if the quarter turn fastener is not correctly installed, the quarter turn fastener may also be released automatically, which likewise results in considerable safety risks, for example in the driving mode.

The invention is based on the object of eliminating the prior art safety risks.

This and other objects are achieved on the basis of the air treatment device of the type in question in that a securing device which is fitted or is fittable to the housing is provided for securing the quarter turn fastener to the housing. In particular, the securing device can secure the quarter turn fastener or a quarter turn ring of the quarter turn fastener against rotation in an opening direction of rotation. By use of a securing device of this type, which is fastened or may be fastenable to the housing, the quarter turn fastener is prevented from being able to be undesirably or abruptly released under pressure. Furthermore, it is not necessary to drill sockets or holes into the quarter turn ring or the quarter turn fastener in order to receive the securing device, which preserves the structural integrity of the quarter turn fastener.

In particular, provision may be made for the securing device to be fastened or fastenable releasably to the housing, which facilitates the securing and releasing of the quarter turn fastener.

It is advantageous if, in a secured state of the quarter turn fastener, the securing device blocks rotation of a quarter turn ring of the quarter turn fastener in one direction of rotation. It is particularly advantageous in this case if, in the secured state, a lug of the quarter turn fastener butts against the securing device. Use is therefore made of already existing structures of a quarter turn fastener, such as the lug, and therefore no further machining steps are required on the quarter turn fastener in order to use the invention. The lug may be a quarter turn lug of the quarter turn fastener, in particular a quarter turn lug of a quarter turn ring; however, provision may also be made for a lug which does not serve as a quarter turn lug, such as a gripping projection, to be blocked by the securing device.

In one embodiment, provision is made for the securing device to be designed as a closure screw. A closure screw provides reliable support and good securing of the quarter turn fastener. Use may also be made of further forms of securing devices, for example the securing device may be designed as a split pin or bolt.

It is particularly advantageous if the closure screw has a closure screw head which, in a secured state, is arranged in such a manner that it blocks movement of a lug of a quarter turn ring of the quarter turn fastener in one direction of rotation. In particular, provision may be made for the closure screw head to butt against the lug in a secured state. A closure screw head can easily be formed so as to block the lug at least in one direction of rotation.

In a preferred development, a bore for receiving the securing device is provided in the housing. The bore may be designed in particular as a threaded bore in order, for example, to receive a closure screw. Secure holding of the securing device in the housing is provided by such a bore.

In this case, it is particularly expedient if the bore reaches into an interior space of the air treatment device, which interior space is pressurized during operation. The securing device then advantageously includes a seal which, in the fitted state, seals the interior space of the air treatment device against a loss of compressed air. It is also advantageous in this connection if, when the securing device is not fitted, the interior space is not sealed. In this case, the air treatment device can therefore not supply the compressed air consumer with compressed air, since pressurized air escapes to the outside via the connection of the interior space to an external region. If the air dryer device is not correctly fitted and secured, the air treatment device therefore cannot be pressurized, which minimizes safety risks associated with the operation of an incorrectly fitted air treatment device.

It is of particular advantage if the securing device has one or more venting ducts. The latter are expediently arranged in such a manner that they permit venting of the air treatment device when the securing device is released. The effect achieved by this is that, whenever there is still pressure in the air treatment device during the initial releasing operation of the securing device, this pressure can escape via the venting duct or the venting ducts. If the release operation is then continued, the air treatment device is no longer pressurized, as a result of which the securing device can be safely released further without the risk of being removed abruptly by high pressure.

Provision may be made for the securing device to have a predetermined breaking point. The latter may result in breaking of the securing device if the securing device is not properly fitted. The securing device is therefore prevented from being fitted incorrectly and with excessive force. It is particularly expedient in this case for a predetermined breaking point of this type to result in a break in the region of the venting duct or the venting ducts, thus preventing the air treatment device from being pressurized when the securing device is broken if the latter can no longer reliably secure the quarter turn fastener. For this purpose, the breaking point should be arranged in such a manner that the venting duct is opened outward by breaking of the predetermined breaking point.

In one embodiment, provision may be made for the housing to have a guide for the securing device. This facilitates the installation of the securing device. In particular, the securing device may be a trough. As a result, the securing device can be easily guided and a fitter's fingers holding the securing device can be easily introduced. Provision may also be made for the guide to completely surround an end region of the securing device and thus to stabilize the securing device during the fitting thereof. In particular, a guide of this type may be a bore. As an alternative, a guide which has both a trough and an element which completely surrounds an end region of the securing device may be provided.

In a particularly preferred development, the housing has a stop for a lug of the quarter turn fastener, said stop blocking rotation of a quarter turn ring of the quarter turn fastener in one direction of rotation. In particular, it is expedient if the stop blocks the rotation of the quarter turn ring in the other direction of rotation than the securing device. The stop can block any lug of the quarter turn fastener or of the quarter turn ring, in particular the lug blocked by the stop may be identical to a lug blocked by the securing device or else may be a different lug of the quarter turn fastener.

It is very particularly advantageous if, in a secured state, a lug of the quarter turn fastener is arranged between the stop and the securing device. For this purpose, the distance between the stop and the securing device may in particular be designed in such a manner that the lug fits precisely in between. Therefore, a precisely defined position of the quarter turn fastener can easily be set. In particular, an incorrect position of the quarter turn fastener and safety risks associated therewith can be avoided. It is particularly expedient that, if the lug does not bear correctly against the stop, the securing device cannot be fastened to the housing, for example, because the lug covers a bore for receiving the securing device if the latter is not correctly positioned.

It is self-evident that any suitable type of quarter turn fastener may be used within the context of this description. It can optionally be ensured by mechanical measures, for example by suitable guidance of the quarter turn ring, that the components of the quarter turn fastener, and in particular the quarter turn ring, can assume the correct position, for example in such a manner that a quarter turn lug can be arranged between the stop and the securing device. Measures suitable for purposes of this type are presumed to be known to a person skilled in the art. It is also contemplated within the context of the invention that the air dryer device is covered by an additional, separate cartridge housing which can likewise be connected to the housing by the quarter turn fastener. It is also possible for the quarter turn ring to be fixedly connected to a housing of the air dryer device or to a cartridge housing of this type. Of course, the quarter turn ring may also be designed as a separate component.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
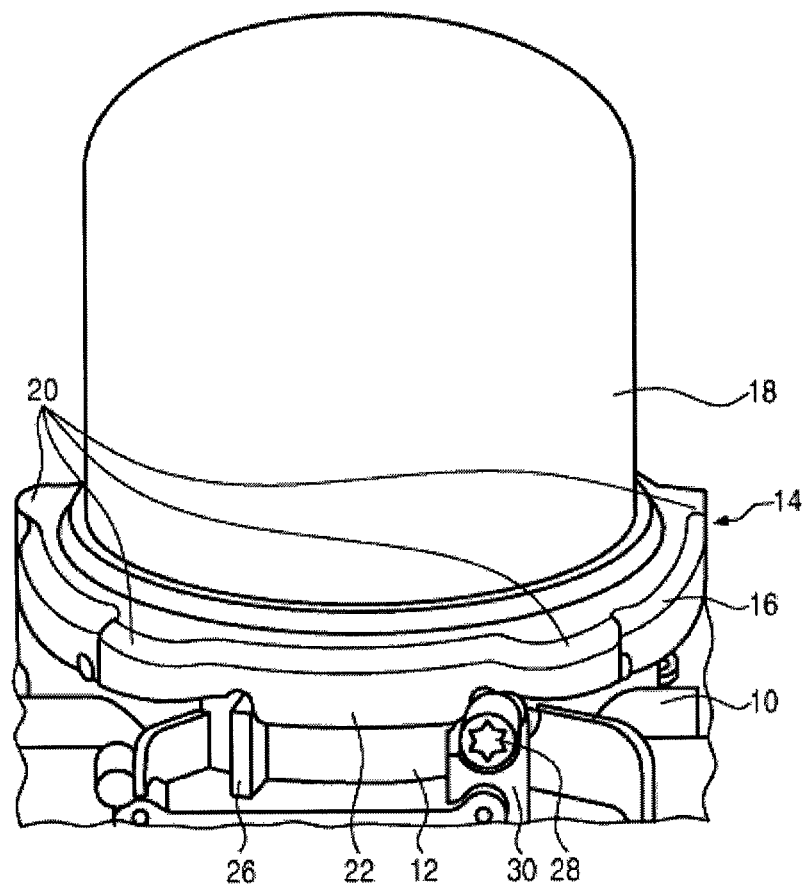
FIG. 1 is an illustration of an air treatment device.

FIG. 1 shows by way of example an air treatment device 10 with a housing 12. The air treatment device 10 is connected to an air dryer cartridge 18 by use of a quarter turn fastener 14 which has a quarter turn ring 16. The details of the air dryer cartridge 18 and of the air treatment device 10 are presumed to be known and are therefore not described in more detail below.

The quarter turn ring 16 may have gripping projections 20 which facilitate rotation of the quarter turn ring, and at least one quarter turn lug 22 which interacts in a known manner with lugs or collars 24 of the housing 12 and of the air dryer cartridge 18 in order to connect the housing 12 and air dryer cartridge 18 to each other by the quarter turn fastener 14.

A stop 26 is furthermore provided on the housing 12. At a certain distance from the stop 26 there is a securing device which is designed in this case as a closure screw 28. The closure screw 28 is screwed into a threaded bore 32 (not visible) in the housing 12. So that the closure screw can easily be fitted and removed, a trough 30 is provided. At the end facing away from the housing 12, the closure screw 28 has a profiled portion for receiving a fitting or removal tool.

The distance between the securing device and stop 26 is selected in such a manner that, in a secured state, the lug 22 is located between the stop 26 and fitted securing device.

FIG. 1 shows the secured state in which the securing device secures the quarter turn fastener 14 against an inadvertent opening movement. In this state, the lug 22 is arranged in such a manner that it is located between the stop 26 and the closure screw 28. The closure screw 28 is arranged in such a manner that it prevents the quarter turn ring 16 from being rotated counter clockwise, since the lug 22 butts against the closure screw 28. On the other side, the stop 26 prevents the quarter turn fastener 14 from being rotated further in the clockwise direction, since the lug 22 butts against the stop 26. Provision may be made for the lug 22 to have an oblique notch on the two abutting sides. In order to remove the air dryer cartridge 18, in the case of the construction shown in FIG. 1, first of all the closure screw 28 has to be released and removed so that the lug 22 no longer strikes there against upon rotation counter clockwise (the release direction in FIG. 1). By use of the stop 26, when the air dryer cartridge 18 is being fitted, the bayonet ring 16 can be rotated in the clockwise direction (in the fitting direction) only until the lug 22 butts against the stop 26. Should the air dryer cartridge 18 not yet have been screwed sufficiently far onto the air treatment device 10 or the housing 12 thereof during fitting, the lug 22 will cover a bore 32, which is provided in the housing 12, for receiving the closure screw 28, and therefore the closure screw 28 cannot be introduced therein. As a result, it can easily be recognized that the installation has not yet been carried out correctly.

Figure 2:
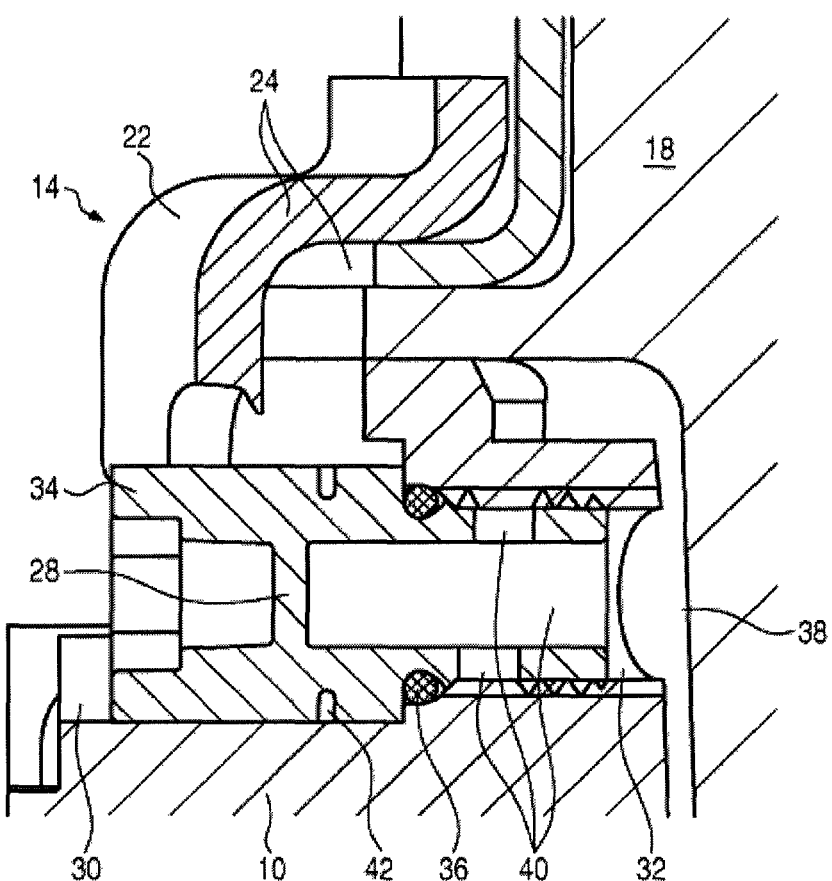
FIG. 2 is a schematic cross-sectional view of a securing device of a quarter turn fastener.

FIG. 2 shows an axially guided cross section of the fitted securing device and of the quarter turn fastener 14. The closure screw 28 has a closure screw head 34 against which the lug 22 can abut. A seal 36 is provided at that end of the closure screw head 28 which faces the housing 12 of the air treatment device 10. When the closure screw 28 is correctly fitted, the seal seals the bore 32 of the closure screw 28 to the outside. The bore 32 is designed as a threaded bore. On the side facing the air treatment device, the closure screw 28 has a thread corresponding to the bore 32. The bore 32 reaches into an interior space 38 of the housing 12 and thus produces a connection to the interior space 38 which is pressurized during operation. Venting ducts 40 are provided within the closure screw 28. In particular, that side of the closure screw 28 which faces the housing 12 is partially open, and therefore compressed air from the interior space 38 can be distributed into the venting ducts 40. In the secured state shown here, the venting ducts 40 are arranged in such a manner that venting is prevented by the seal 36. If, however, the closure screw 28 is released, the releasing movement of the closure screw 28 leads to the seal 36 no longer being in contact with the housing 12, and air can escape via the venting ducts 40 into an external region. As a result, the interior space 38 is vented and the closure screw 28 can be released from the housing 12 without the risk of pressure from the interior space 38 abruptly removing the closure screw 28.

A predetermined breaking point 42 of the closure screw 28 is furthermore shown. If too much force is exerted on the closure screw 28, for example because installation has not been carried out correctly, the predetermined breaking point 42 results in breaking in the region of the venting ducts 40. Therefore, in this case, even if the lower region of the closure screw 28 is screwed in the bore 32 in such a manner that the seal 36 acts in a sealing manner, venting of the interior space 38 is achieved through the venting ducts 40. The interior space 38 therefore cannot be pressurized. Safety risks which are associated with the fact that the closure screw 28 no longer serves to secure the quarter turn fastener 14 or the quarter turn ring 16 can therefore be avoided for this case.

Figure 3:
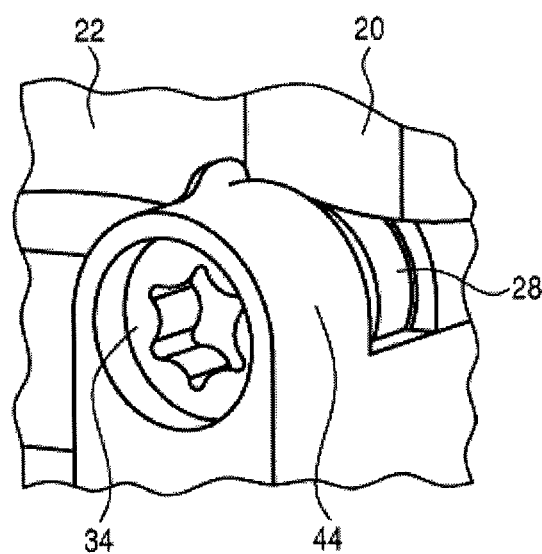
FIG. 3 is an example of a guide for a closure screw.

FIG. 3 shows a guide 44 for the closure screw 28. The guide 44 completely surrounds an upper part of the closure screw head 34 of the closure screw 28, thus resulting in a precise alignment of the closure screw 28 during fitting. The arrangement is dimensioned in such a manner that, when the closure screw 28 is released and removed, the guide 44 does not block the lug 22 of the quarter turn ring 14.

LIST OF REFERENCE NUMBERS

10 Air treatment device
12 Housing
14 Quarter turn fastener
16 Quarter turn ring
18 Air dryer cartridge
20 Gripping projection
22 Quarter turn lug
24 Lug
26 Stop
28 Closure screw
30 Trough
32 Bore
34 Closure screw head
36 Seal
38 Interior space
40 Venting ducts
42 Predetermined breaking point
44 Guide The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An air treatment device for a commercial vehicle having a housing which is designed for connection to an air dryer device via a quarter turn fastener, comprising:
    a securing device operatively configured to be fitted onto the housing,
    wherein the securing device secures the quarter turn fastener to the housing,
    wherein the securing device has at least one predetermined breaking point and at least one venting duct, the predetermined breaking point being configured to break at an operator-applied breaking torque above an installation torque required for installation of the securing device when the securing device is properly fitted onto the housing;
    wherein the predetermined breaking point is arranged in such a manner that the at least one venting duct is opened outward by breaking of the predetermined breaking point.

2. The air treatment device as claimed in claim 1, wherein, in a secured state, the securing device blocks rotation of a quarter turn ring of the quarter turn fastener in one direction of rotation.

3. The air treatment device as claimed in claim 1, wherein, in a secured state, the securing device abuts against a lug of the quarter turn fastener.

4. The air treatment device as claimed in claim 2, wherein, in a secured state, the securing device abuts against a lug of the quarter turn fastener.

5. The air treatment device as claimed in claim 1, wherein the securing device is a closure screw having a closure screw head which, in a secured state, is arranged such that the screw head blocks rotation of a lug of a quarter turn ring of the quarter turn fastener in one direction of rotation.

6. The air treatment device as claimed in claim 2, wherein the securing device is a closure screw having a closure screw head which, in a secured state, is arranged such that the screw head blocks rotation of a lug of a quarter turn ring of the quarter turn fastener in one direction of rotation.

7. The air treatment device as claimed in claim 3, wherein the securing device is a closure screw having a closure screw head which, in a secured state, is arranged such that the screw head blocks rotation of a lug of a quarter turn ring of the quarter turn fastener in one direction of rotation.

8. The air treatment device as claimed in claim 1, wherein a bore for receiving the securing device is provided in the housing.

9. The air treatment device as claimed in claim 8, wherein the bore reaches into an interior space of the air treatment device, which interior space is pressurized during operation.

10. The air treatment device as claimed in claim 1, wherein, in a secured state, the securing device seals the air treatment device against a loss of compressed air.

11. The air treatment device as claimed in claim 10, wherein, in a non-secured state, the securing device does not seal the air treatment device against a loss of compressed air.

12. The air treatment device as claimed in claim 1, wherein at least one of the venting ducts is arranged so as to permit venting of the air treatment device when the securing device is released.

13. The air treatment device as claimed in claim 1, wherein the housing has a guide for the securing device.

14. The air treatment device as claimed in claim 13, wherein the guide completely surrounds an end region of the securing device.

15. The air treatment device as claimed in claim 1, wherein the housing has a stop for a lug of the quarter turn fastener, said stop blocking rotation of the quarter turn fastener in one direction of rotation.

16. The air treatment device as claimed in claim 15, wherein, in a secured state, the lug of the quarter turn fastener is arranged between the stop and the securing device.

* * * * *